United States Patent [19]

Seppala et al.

[11] 4,345,212
[45] Aug. 17, 1982

[54] EFFICIENT OPTICAL PULSE STACKER SYSTEM

[75] Inventors: Lynn G. Seppala; Roger A. Haas, both of Pleasanton, Calif.

[73] Assignee: The United States of America as represented by the United States Department of Energy, Washington, D.C.

[21] Appl. No.: 205,076

[22] Filed: Nov. 10, 1980

[51] Int. Cl.³ .......................................... H01S 3/098
[52] U.S. Cl. .................................. 330/4.3; 350/174; 372/92
[58] Field of Search .................... 330/4.3; 331/94.5 C, 331/94.5 G, 94.5 M; 350/169, 174

[56] References Cited

U.S. PATENT DOCUMENTS

| | | | |
|---|---|---|---|
| 3,879,109 | 4/1975 | Thamos | 350/174 |
| 3,942,127 | 3/1976 | Fluhr et al. | 330/4.3 |
| 3,973,213 | 8/1976 | Rockwood et al. | 330/4.3 |
| 4,001,705 | 1/1977 | Sinclair et al. | 330/4.3 |
| 4,073,572 | 2/1978 | Avicola | 350/174 |
| 4,156,852 | 5/1979 | Hagen | 33/4.3 |
| 4,174,150 | 11/1979 | Congleton | 350/174 |
| 4,200,846 | 4/1980 | Stack et al. | 330/4.3 |
| 4,205,278 | 5/1980 | George et al. | 331/94.5 G |
| 4,264,869 | 4/1981 | Hunter | 330/4.3 |
| 4,267,526 | 5/1981 | Paxton et al. | 331/94.5 D |

OTHER PUBLICATIONS

Jacobs et al., "Intensification of Rare Gas Halide . . . Laser Fusion", 1980, pp. 1-4, European Conf. Opt. Sys. & Applic., vol. 41.
Ewing et al., "Optical Pulse Comp., . . . Fusion", 5/79, pp. 368-379, IEEE J.Q.E., vol. QE-15, #5.
Stack, "Lasers and Power Systems . . . Rectors", 5/11/78, pp.-23, NTIS UR-78-1350, Americ. Nuc. Soc., 3rd., Top. Mfg., Santa Fe, NM.

Primary Examiner—Nelson Moskowitz
Attorney, Agent, or Firm—Marvin J. Marnock; Roger S. Gaither; Richard G. Besha

[57] ABSTRACT

Method and apparatus for spreading and angle-encoding each pulse of a multiplicity of small area, short pulses into several temporally staggered pulses by use of appropriate beam splitters, with the optical elements being arranged so that each staggered pulse is contiguous with one or two other such pulses, and the entire sequence of stacked pulses comprising a single, continuous long pulse. The single long pulse is expanded in area, and then doubly passed through a nonstorage laser amplifier such as KrF. After amplification, the physically separated, angle-encoded and temporally staggered pulses are recombined into a single pulse of short duration. This high intensity output beam is well collimated and may be propagated over long distance, or used for irradiating inertial confinement fusion targets.

9 Claims, 17 Drawing Figures

EFFICIENT OPTICAL PULSE STACKER SYSTEM

BACKGROUND OF THE INVENTION

This invention relates to optical amplification and pulse stacking of short duration laser pulses. The United States Government has rights in this invention, pursuant to Contract No. W-7405-ENG-48 between the U.S. Department of Energy and the University of California Lawrence Livermore National Laboratory.

One promising approach to inertial confinement fusion uses short wavelength (visible or uv.), short duration ($\Delta t \lesssim 20$ nsec) laser pulses of high efficiency for target compression. The rare gas halide (RGH) and excimer lasers are attractive here as they manifest wall plug energy efficiencies as high as 8–10% at wavelength $\lambda = 1600$–$5000$ Å. Unfortunately, the RGH and excimer optical amplification media are nonstorage media, in the sense that the associated radiative lifetimes of useful excited states seldom exceed 40 nsec. so that continuous pumping of such media is often required. Further, the damage thresholds for optical components usually do not exceed 10 Joules/cm$^2$ while the total energy to be delivered to the target exceeds several kilojoules. These requirements appear to preclude straightforward, single pulse amplification using RGH or excimer laser media.

SUMMARY OF THE INVENTION

One persistent problem in the use of rare gas halides or excimer gases as laser amplifier media is that these media are most efficient and thus most attractive when the pulse length is of the order of 200 nsec. A pulse of this length is of little use for certain applications such as inertial confinement fusion that require short, intense pulses of temporal duration $\Delta t \sim 20$ nsec. The subject invention forms a composite beam of temporal length 200–400 nsec from many shorter beams of length $\sim 20$ nsec., passes the beam through a laser amplifier such as a rare gas halide or excimer amplifier, and decomposes the composite beam into a substantially parallel, shorter length beams of high intensity.

One object of this invention is the provision of method and apparatus for producing an intense, high power laser beam of short, controllable temporal duration.

Another object of this invention is to provide method and apparatus for producing an intense, high power laser beam while avoiding optical damage at any of the optical elements of the laser system.

Additional objects, novel features and advantages thereof are set forth in the description that follows, with reference to the accompanying drawings, and may be realized by means of the instrumentalities and combinations pointed out in the appended claims.

To achieve the foregoing objects in accordance with the subject invention, as broadly described herein, the method may comprise the steps of replicating a laser beam of temporal duration $\tau$ as an array of N ($\geq 2$) such beams; time shifting the N beams relative to one another and stacking the beams end-to-end so as to form a continuous composite beam of temporal duration $\Delta t = N_\tau$; passing the continuous composite beam one or more times through an optical amplification medium; physically separating the composite beam into N amplified beam replicas; and time shifting the replica beams so as to bring all beams into temporal coincidence in a spatially contiguous array for subsequent use.

In one embodiment, the apparatus includes a three mirror reflective telescope with spherical mirrors. The first mirror accepts the time shifted collimated replicated beams from an array of beam splitters, expands the beams and directs them toward the amplifier so that each beam substantially fills the amplifier medium. The second mirror redirects the beams through the amplifier a second time and focuses them toward the third mirror. The third mirror recollimates the replicated beams and directs them toward an array of plane mirrors that removes the temporal delay and recombines the beams into a collimated parallel array. The radii of curvature of the three mirrors are chosen to control the beam area on the amplifier medium and to provide the necessary focusing or defocusing of the beam. The angular tilts of the mirrors with respect to one another are chosen to minimize the optical aberrations of the telescope that occur because the mirrors do not lie on a common optical axis.

One salient advantage of the subject invention is to allow the laser amplifier a useful amplification interval to be adjusted to a time interval for which the amplifier is most efficient. Another advantage is to allow the intensities of the individual replication light beams incident on various optical components to be kept below the optical damage thresholds for such components.

BRIEF DESCRIPTION OF THE DRAWINGS

The accompanying drawings, as incorporated herein, illustrate four embodiments of the subject invention and, together with the detailed description, explain the principles of the invention.

DETAILED DESCRIPTION

The direct application of efficient nonstorage (i.e., short upper lifetime $\lesssim 10$ nsec) laser media, such as rare gas halide excimers (KrF, XeF, HeCl, etc.) to inertial confinement fusion is presently limited by the discovery and development of efficient and inexpensive laser pulse compression techniques. The utilization of these media is further complicated by the fact that nonsaturable photoabsorption losses within the laser medium limit the output intensity and power gain that can be achieved at high efficiency. Thus, large compression ratios and intensifications are required. For example, in the KrF laser, nonsaturable losses limit the extraction efficiency to $\approx 50\%$, and the maximum output flux at this extraction efficiency is $\approx 26$ MW/cm$^2$. The overall efficiency of such KrF lasers is $\approx 8\%$.

Figure 1:
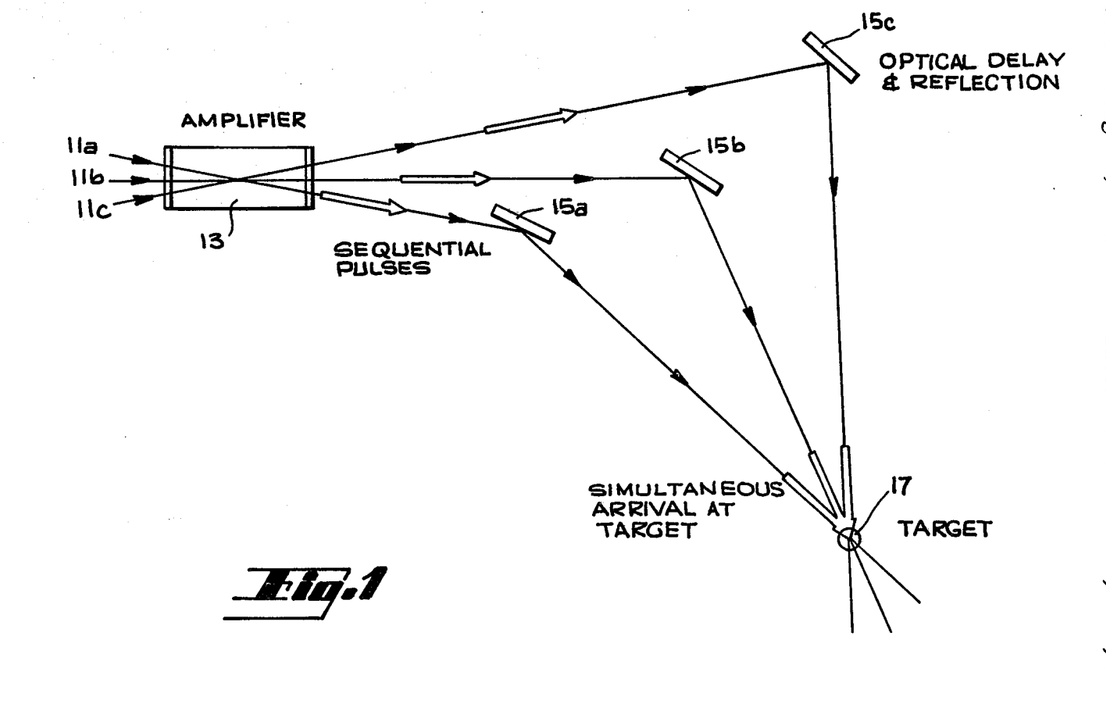
FIG. 1 is a schematic view of a first embodiment of angle multiplexing or pulse stacking according to the invention.
Figure 2:
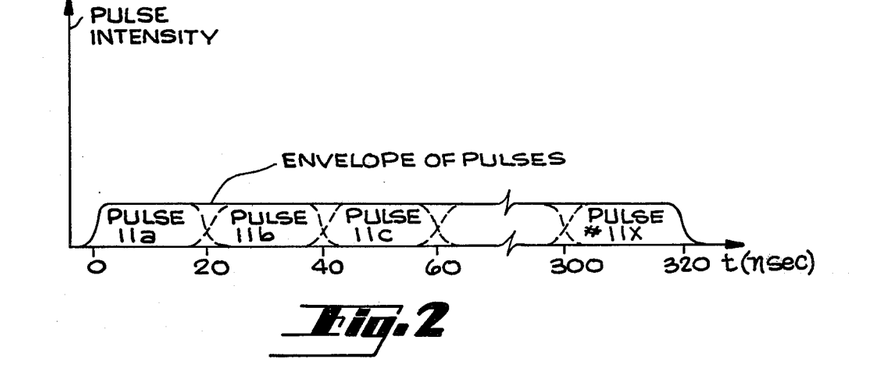
FIG. 2 is a graph showing the effect of pulse replica staggering at the amplifier medium.

One approach to producing short pulses with nonstorage rare gas halide or excimer amplifier media is the angle multiplexing or pulse stacking technique shown schematically in FIG. 1. In this approach, a sequence of short, angle-coded pulses 11a, 11b, 11c, 11d, etc. of, say, $\tau = 20$ nsec duration each is passed through the amplifier 13, with each pulse being suitably delayed by an integral multiple of $\tau$ so that the amplifier sees one long, continuous pulse (FIG. 2). For purposes of illustration, in the following, the amplifier medium is assumed to be KrF. However, the fundamental points also hold for other nonstorage laser media, such as other rare gas halide and rare gas excimer lasers, such as XeF, XeCl, XeBr and Ar$_2$. After amplification, the temporal delay is removed by reflection from a sequence of mirrors 15a, 15b, 15c, 15d, etc., arranged to incorporate relative time delays. The pulses are then temporally recombined and angle-decoded into one 20 nsec duration pulse that irradiates the target 17. Since the maximum output intensity of each pulse after amplification is $\approx 20$ MW/cm$^2$, its energy fluence is $\approx 0.4$ J/cm$^2$, well below the damage fluence of the optical transport and focusing materials used for the mirrors. To achieve a 1 MJ output from such a system, without focusing, would require a total mirror area facing the target of $\approx 250$ m$^2$, or over sixty (60) 2m$\times$2m mirrors. Such an approach would be extremely expensive and cumbersome, due to its highly inefficient use of optical materials. The present invention utilizes the fundamental pulse-stacking concept, but employs beam transport optics that control each beam cross section to simultaneously maximize beam fluence and amplifier extraction efficiency.

Figure 3:
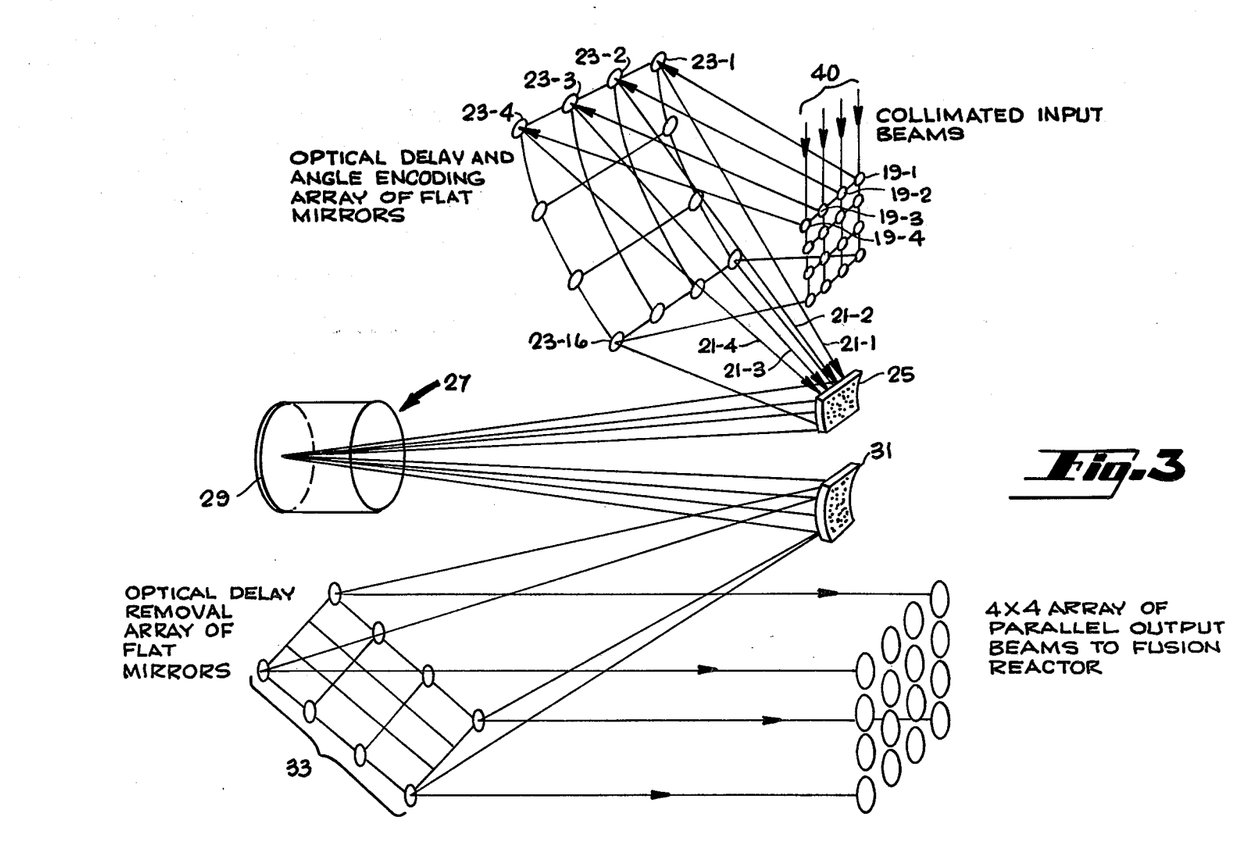
FIG. 3 is a more detailed view of an alternative embodiment of the invention.
Figure 4:
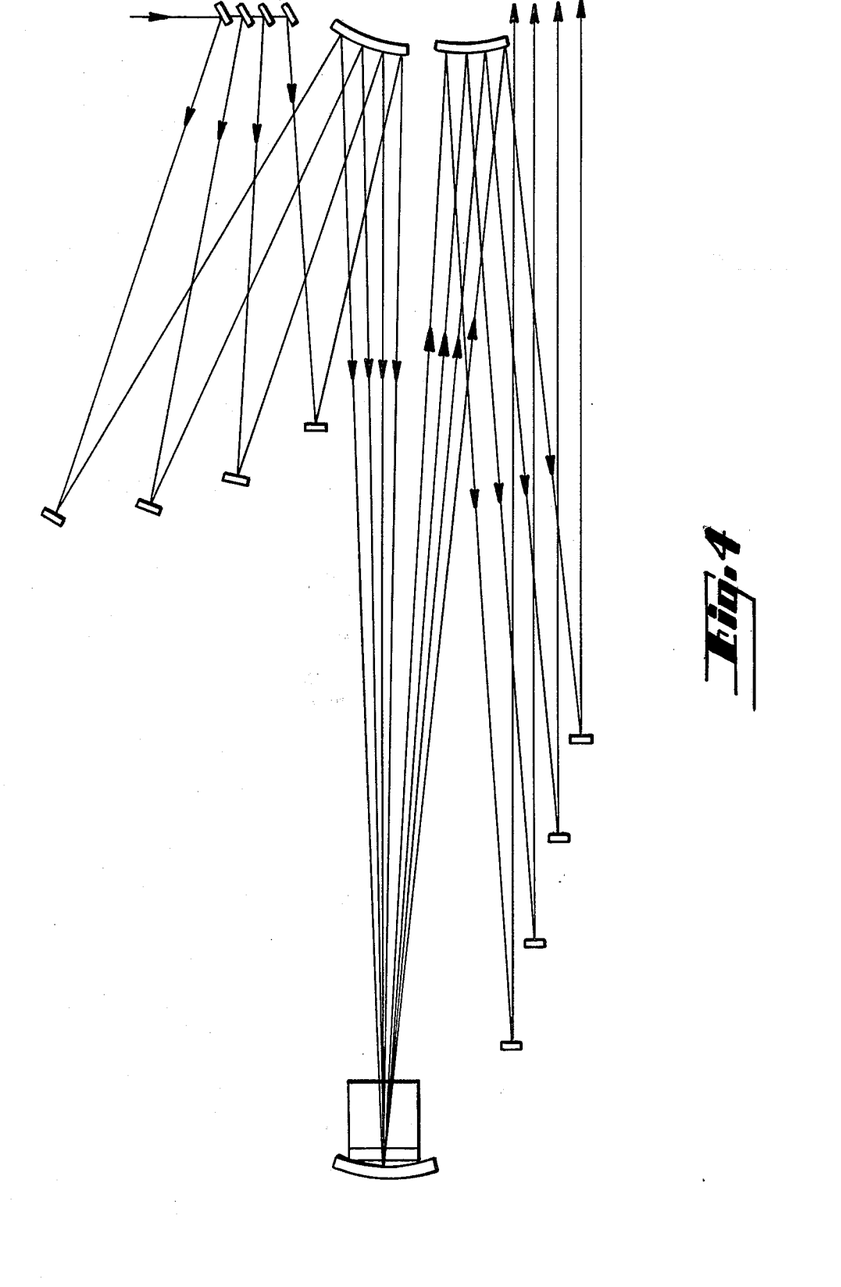
FIG. 4 is a schematic side view of the embodiment of FIG. 3.

The above-mentioned problems are eliminated or substantially reduced by the subject invention, shown schematically in one embodiment in FIGS. 3 and 4. This exemplary system can produce a temporal pulse compression of 16. Greater compressions are achieved by simply increasing the number of reflectors and increasing the dimensions of the apparatus to accommodate the larger number of beams. To activate the system, a short pulse from an appropriate laser is injected onto an array of partially transparent reflectors 19-1, 19-2, ..., 19-16, and divided into 16 equal intensity pulses, 21-1, 21-2, ..., 21-16. These pulses are then sequenced in time by reflection from another set of reflectors 23-1, 23-2, ..., 23-16, as shown. For example, if the pulse length of the injected signal is 20 nsec, then after beam splitting, delay, and "recombination" (as in FIG. 2), the effective pulse length will be 16 times larger, or 320 nsec. This latter set of mirrors is arranged so as to optically delay each of the 16 beams by time intervals $\Delta t_r = r\tau (r = 0, 1, ..., 15)$ so that these beams arrive at a common beam expander (convex reflector) 25 in serial order, forming a temporally continuous pulse (see FIG. 2) of time duration $\Delta t = 16\tau \approx 320$ nsec. The temporally sequenced pulses are reflected from the convex reflector 25 and expanded to fill the aperture of an amplifier 27. After passage once through the amplifier, each pulse encounters a large concave reflector 29 that returns the pulse through the amplifier for further amplification, and directs it to a second convex reflector 31. The reflector 31 recollimates and directs each beam to an array 33 of plane 100% reflectors, positioned in such a way that, after reflection from this array, the beams are parallel to each other, and all the pulses are temporally coincident. The final pulse length is again 20 nsec. The convex reflectors 25 and/or 31 may be replaced by multiple convex contiguous reflectors so as to more easily control the individual beams 23-1, 23-2, ..., 23-16. More generally, one may form, amplify and reform $N = m \cdot n$ such pulses, each of some nominal length $\Delta t \approx 20$ nsec. However, the amplifier has been run for 320 nsec, and the output flux for each amplifier pulse is $\approx 20$ MW/cm$^2$. This output is focused onto an area that is smaller by a factor of $\approx 16$ than the total reflective array 33, producing a collimated output pulse fluence of $\approx 6.4$ J/cm$^2$. For example, if the aperture of the output array were 2 m$\times$2 m, then the output energy would be $\approx 160$ kJ. Six such final amplifier configurations would produce almost 1 MJ of energy. By beam expansion and subsequent focusing of the beam, the optical flux may be made nearly constant during the pulse stacking process. This unique feature minimizes the size of each optical element and thereby reduces cost and system complexity. Furthermore, the spherical reflector tilt angles are chosen such that the wavefront distortions introduced by each tilted surface are corrected in the output beam, allowing a further reduction in the length of the pulse stacker without degrading the output beam wavefront.

The subject invention makes it possible to use efficient high gain, flux limited, nonstorage laser media, such as the rare gas halide excimers, directly in fusion applications. Because these media are used directly, the highest potential efficiency of the laser media is available in the output of this system. The novel features of the subject invention are:

(1) assemblage of components (FIG. 3);
(2) operation of each optical element near the damage flux limit, thus minimizing element size (i.e., fabrication, alignment, and control costs);
(3) use of only three spherical reflectors and no aspherical optical components, so as to minimize fabrication costs;
(4) high pulse compression ($\sim 16$) achieved with a spatially compact optical train;
(5) high intensification ($\geq 10x$) of the exciplex laser output achieved, using focusing and recollimation techniques;
(6) collimation and maintenance of parallel input and output beams, thus simplifying the coupling of the system to the laser front end section and the target;
(7) small angles of incidence preserved on all spherical optical elements; and
(8) optical transport losses reduced by minimizing the number of beam reflections after the beams exit from the amplifier.
(9) large pulse compressions (as high as 40-50) achieved, thus reducing the pulsed power requirements for a non-storage laser.
(10) double passing of the beam within the amplifier medium is used to control gain so as to limit parasitics and ASE buildup and maximize amplifier efficiency and total output energy.

Figure 5:
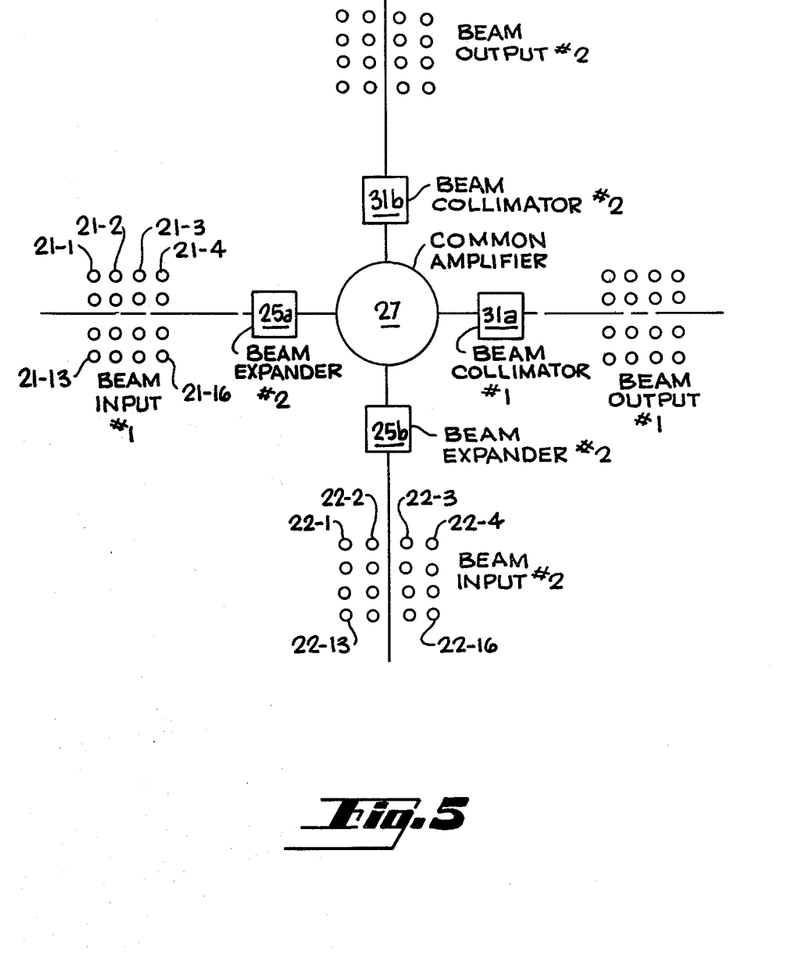
FIG. 5 is a schematic end view of an alternative embodiment, combining two sets of beams of passing through a single amplifier.
Figure 6A:
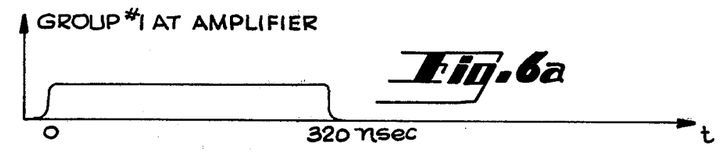
FIGS. 6a, b, c exhibit a first alternative time sequence for passage of the 2 sets of beams through the amplifier in the embodiment of FIG. 5.
Figure 6B:
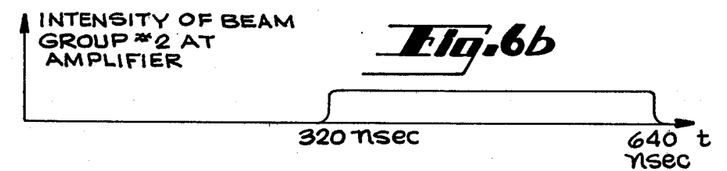
Figure 6C:
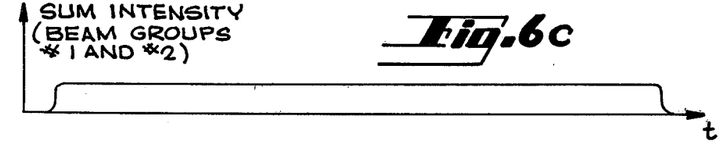
Figure 7A:
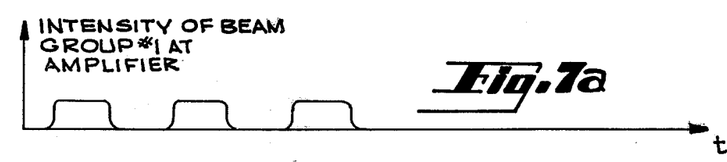
FIGS. 7a, b, c exhibit a second alternative time sequence for passage of the 2 sets of beams through the amplifier in the embodiment of FIG. 5.
Figure 7B:
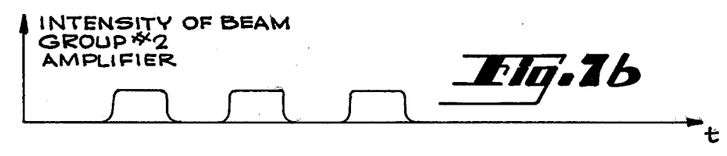
Figure 7C:
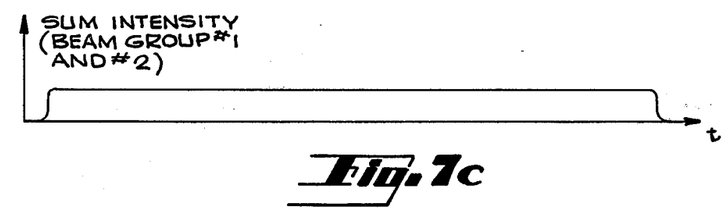

FIG. 5 shows schematically an end view of a first alternative embodiment of the invention, wherein 2 sets of time-delayed beams 21-1, 21-2, ..., 21-16 and 22-1, 22-2, ..., 22-16 are utilized, with the first set of 16 beams being reflected in serial order from a common beam expander (convex mirror) 25a and thence to the amplifier 27, after which the second group of 16 beams is reflected in serial order from a second common beam expander 25b and thence to the amplifier 27. After passage one or more times through the common amplifier 27, the first and second groups of beams are passed to their respective beam expanders 31a and 31b and thence to their respective beam output optics. In one approach for time sequencing of the two sets of 16 beams, shown in FIG. 6a, 6b, 6c, the first set of 16 beams passes into and through the amplifier 27 before the second group of 16 beams arrives. In an alternative approach for time sequencing, shown in FIGS. 7a, 7b, 7c, the two sets of 16 distinct beams are interlaced in time so that the sequence of beams passing through the amplifier 27 is 21-1, 22-1, 21-2, 22-2, ..., 21-16, 22-16, or any other desired sequence of the 32 beams. One advantage of this second beam sequencing approach is the possible elimination of beam cross-talk; concomitant disadvantages include the optical complexity required for temporally interlacing the two sets of beams.

Figure 8:
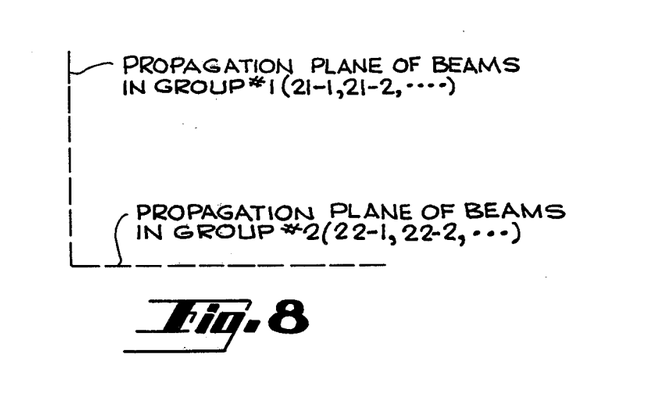
FIG. 8 is a schematic end view of the embodiment of FIG. 5 using 2 sets of beams.
Figure 9:
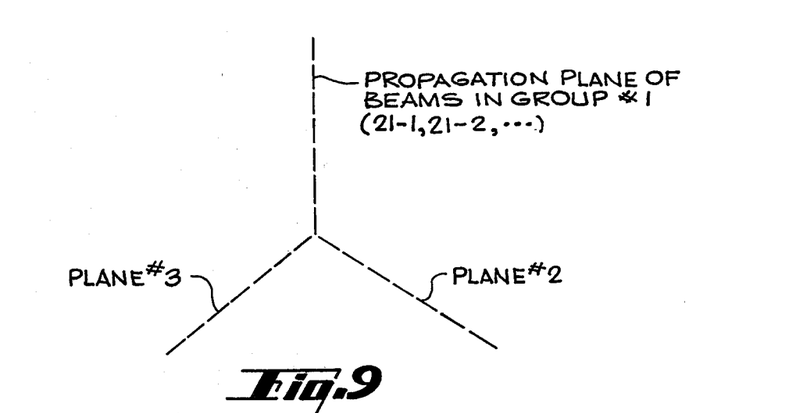
FIG. 9 is a schematic end view of an analogous embodiment that combines 3 sets of beams.

In the embodiment of FIG. 5, the initial planes containing the 2 sets of beams are approximately at right angles to one another, as suggested schematically in the end view of FIG. 8. A second alternative embodiment is indicated in the end view of FIG. 9, showing 3 sets of beams, each set of beams lying initially in a plane (or set of parallel planes), with the 3 planes being positioned angularly substantially 120° apart. With this latter configuration, the time sequencing of FIGS. 6a, 6b, 6c and 7a, 7b, 7c would be changed to accommodate 3 sets of interlacing beams.

Given the first order system constraints (initial and amplifier beam diameters, maximum allowable physical length, minimum angles for unobstructed laser beam passages), one has in hand several design parameters or degrees of freedom; three radii of curvature, two mirror separation distances and three mirror tilt angles. Returning to FIG. 3, one attractive design is the following. Each of the input beams 21-1, ..., 21-16 is 10 cm = 10 cm and, after reflection from the beam expander 25, each beam expands to 100 cm × 100 cm so as to substantially fill the aperture of the amplifier 27 and amplifier concave mirror 29. With the first beam diameter ratio (after and before reflection from the beam expander 25) $m_{21}=10$, the radius of curvature of the expander 25 is chosen to satisfy $$1/R_1=(m_{21}-1)/(2|d_1|)=4.5/|d_1|,$$

$d_1$ = distance from center of reflection of beam expander 25 to center of reflection of concave reflector 29.

Each of the input beams is reflected from the amplifier concave mirror (diameter 100 cm) through the amplifier medium a second time and is focused down to a 31.62 cm × 31.62 cm convex reflector 31 that recollimates each beam and directs it toward an appropriate one of the array of the flat reflectors 33. The second beam diameter ratio $m_{23}=100/31.6=3.16$, and the ratio of curvature of the reflectors 31 ($R_3$) and 29 ($R_2$) are chosen to satisfy $$1/R_3=(m_{23}-1)/(2\ d_2)=1.08/d_2$$

$$1/R_2=1/(m_{21}R_1)+1/(M_{23}R_3)=0.1/R_1+0.316/R_3,$$

$d_2$ = distance from center of reflection of convex reflector 29 to center of reflection of convex mirror 31.

Each flat reflector of the array 33 is at least 31.6 cm × 31.6 cm, and the separations $d_1$ and $d_2$ are 100 meters. The tilt angles of the expander mirror 25, amplifier mirror 27 and collimator mirror 31 are chosen here as 1.1465°, −0.5° and 0.6°, respectively, to maximize the amplifier optical fill factor (fraction of amplifier aperture area covered by one or the other beam passing through the amplifier).

Figures 10A, 10B:
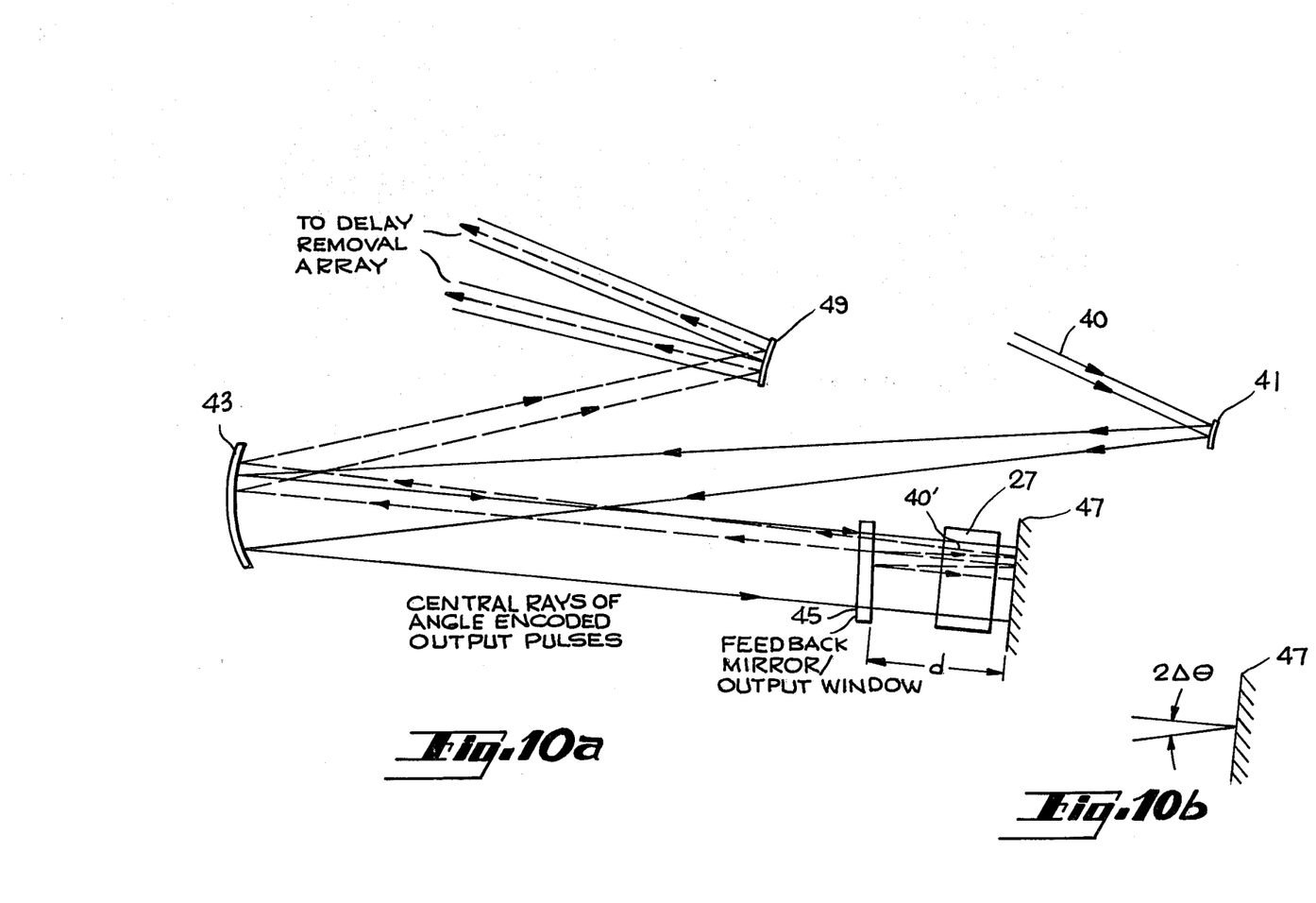
FIGS. 10a and 10b are schematic views of an alternative embodiment that forms the sequence of N consecutive pulses at the amplifier itself.

FIG. 10 shows an alternative design for the pulse stacker, wherein the sequence of pulses is produced at or the near the amplifier itself rather than being produced by a beam splitter array. An incident collimated input pulse 40 (of temporal length $\Delta t = \tau \sim 20$ nsec) is reflected from a diverging reflector 41 and by a convergent collimating reflector 43 so as to pass through a partially transmitting feedback reflector 45 and the amplifier 27 in that order. The pulse is then reflected by a 100% reflecting plane reflector 47 that is tilted slightly so that the incident pulse is reflected non-normally, at a small incidence angle $\Delta\theta$, through the amplifier again (pulse 40'). This latter pulse is partially transmitted at the feedback reflector 45 and is reflected at the reflector 43 (from a different portion of the reflector than the input pulse) to another (divergent) collimator reflector 49 for output. The reflected portion of the pulse 40' at the feedback reflector 45 passes through the amplifier 27 a third time, is reflected non-normally at 47, passes through the amplifier a fourth time and proceeds toward the feedback reflector 45 again. Again, part of this pulse is transmitted, and then reflected at 43 and 49, and a portion is reflected at 45 to pass back through the amplifier 27. If the separation distance d of the reflectors 45 and 47 is chosen to be $d = c\tau/2$ (c=average speed of light between reflectors 45 and 47), a sequence of temporally contiguous pulses, each of temporal length $\Delta t = c\tau$, will be produced at the feedback mirror 45 and passed to the collimation reflectors 43 and 49 for time delay, recollimation and irradiation of a target. After some time period $\Delta t' = N\tau$, the amplifier 27 no longer amplifies a pulse passing therethrough, and any remaining multiply reflected (passing between 45 and 47) will have significantly reduced intensity and pass harmlessly through the system. The small incidence angle $\Delta\theta$ at the end reflector 27 is chosen so that the multiply reflected pulses (1,2,3 ..., N) at the feedback reflector 45 do not "walk off" that reflector as one pulse replica succeeds another.

Figure 11:
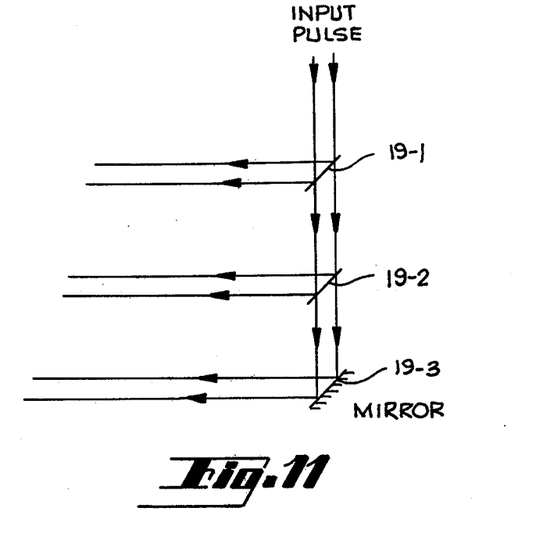
FIG. 11 is a schematic view of one embodiment of a beam splitter, useful in the initial beam replication.
Figure 12:
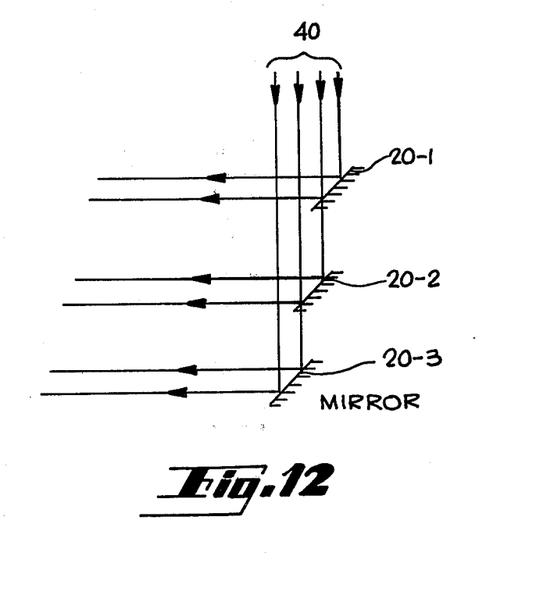
FIG. 12 is a schematic view of a second embodiment of a beam replicator, using beam scrapers.

FIG. 11 exhibits one approach to input beam or pulse replicators, using beam splitters 19-1, 19-2, 19-3 etc., as suggested in FIG. 3. An alternative approach, exhibited in FIG. 12, uses a sequence of beam scraper mirrors 20-1, 20-2, 20-3, etc., carefully positioned so that each such mirror intercepts substantially the same fractional cross sectional area of the input pulse beam 40 so as to form a replica of the original pulse. This alternative approach avoids the high flux loading required of the first few beam splitters 19-1, 19-2, etc., in the embodiment shown in FIG. 11 but may introduce some diffraction losses at the edge of the scraper mirrors 20-1, etc. Another advantage of the embodiment of FIG. 12 is that the (fully reflecting) mirrors 20-1, etc. may be less expensive as they are not required to perform as both reflectors and as transmitters.

The foregoing description of preferred embodiments of the subject invention, presented for purposes of illustration, is not intended to be exhaustive or to limit the invention to the forms disclosed. Variations and modifications may be made without departing from the scope of the invention.

We claim:

1. A method for production of a high power laser beam, the method comprising the steps of:

providing a laser amplifier containing an amplifier medium, with an entrance aperture at one end and a concave, substantially perfect reflector mirror at the other end of the amplifier;

providing a collimated initial beam of the frequency to be amplified and of temporal duration $\tau$, whose optical intensity is less than the optical damage threshold for the laser amplifier optical components;

splitting the initial beam into N (N≧2) collimated, lower intensity replication beams of the initial beams;

shifting the N replication beams in time and stacking the beams end-to-end so as to form a continuous composite beam of temporal duration substantially $N\tau$, with the N replication beams still being slightly separated spatially from one another;

reflecting the N component replication beams from a first convex reflector so that each replication beam is directed toward and is expanded to substantially fill the optical entrance aperture of the amplifier medium;

exciting the amplifier medium;

passing the composite beam of temporal duration $\Delta t = N\tau$ through the excited amplifier medium to increase the intensity of each replication beam;

reflecting the composite beam from the amplifier medium concave reflector mirror to contract the beam and passing the reflected composite beam through the amplifier medium a second time, in a direction substantially opposite to the direction of the first beam passage therethrough;

directing the composite beam toward a second convex reflector that physically separates the composite beam into a sequence of N single replication beams again, each of time duration substantially $\tau$;

reflecting the composite beam from the second convex reflector such that each replication beam is collimated; and redirecting and temporally shifting the replication beams so that all replication beams are substantially parallel and are substantially temporally coincident as a spatially contiguous array of replication beams.

2. A method according to claim 1, further including the step of choosing said amplifier medium from the group consisting of KrF, XeF, XeCl and XeBr.

3. Apparatus for producing a high power laser beam, the apparatus comprising:

an initial beam of substantially monochromatic radiation of temporal duration $\tau$;

beam splitter means positioned to accept and split the initial beam into an array of N (N≧2) collimated, lower intensity replication beams of the initial beam;

an amplifier medium, having an optical entrance aperture at one end and a concave spherical reflector at the opposite end thereof;

first beam delay means, positioned to intercept each replication beam in the array of N replication beams produced by the beam splitter means, for introducing relative time delays between the N replication beams so that these beams arrive at the amplifier medium in serial order, forming a temporally continuous pulse of length substantially $\Delta t = N\tau$;

a first convex reflector, positioned to intercept and expand each replication beam in the array of N replication beams issuing from the first beam delay means so that each such replication beam is reflected toward, substantially fills the optical entrance aperture of and passes through the amplifier medium, with the amplifier medium concave reflector acting to reflect each incident replication beam through the amplifier medium a second time in substantially the opposite direction;

a second convex reflector, positioned adjacent to the first convex reflector and oriented to accept and reflect each replication beam issuing from the amplifier medium so that each replication beam is collimated; and second time delay means and recombination means, positioned to intercept each replication beam in the array of replication beams reflected by the second convex reflector, for rendering the N replication beams substantially parallel in a contiguous array and for introducing relative time delays in the N replication beams so that the replication beams are substantially temporarily coincident.

4. Apparatus according to claim 3, wherein said amplifier medium is drawn from the group consisting of KrF, XeF, XeCl, and XeBr.

5. Apparatus according to claim 3 wherein said initial beam has temporal duration $\tau \leq 20$ nanoseconds.

6. Apparatus according to claim 3, wherein said first convex reflector and said second convex reflector are each positioned a distance substantially 100 meters or more from said amplifier medium.

7. Apparatus according to claim 3, wherein said beam splitter means is a finite sequence of partially transmissive/partially reflective reflectors, positioned substantially collinearly so as to intercept said initial beam and split said initial beam into N substantially equal intensity replication beams.

8. Apparatus according to claim 3, wherein said beam splitter means is a finite sequence of substantially 100% reflective beam scrapers, positioned so that each beam scraper intercepts and reflects substantially the same fractional cross sectional area of said initial beam so as to form N replication beams from said initial beam.

9. Apparatus for producing a high power laser beam, the apparatus comprising:

an initial beam of substantially monochromatic radiation of temporal duration $\tau$;

a first divergent reflector arranged to intercept the initial beam and to reflect a diverging beam;

a convergent reflector, arranged to intercept the diverging beam that has been reflected from the first divergent reflector and to reflect a substantially collimated beam;

a plane reflector, arranged to intercept the collimated beam that has been reflected from the divergent reflector and to reflect the collimated beam at a small, non-zero angle of incidence toward the convergent mirror;

a partially transmissive/partially reflective feedback reflector, positioned between the convergent reflector and the plane reflector at a distance substantially $d = C\tau/2$ from the plane reflector whereby part of the collimated beam may reflect between the plane reflector and the feedback reflector N times, producing a predetermined number N of replicated beams each of temporal duration substantially $\Delta t = \tau$;

an amplifier medium for the collimated beam, positioned between the feedback reflector and the plane reflector to intercept the collimated beam reflected from the plane reflector or from the feedback reflector;

a second divergent reflector, positioned to intercept a diverging, amplified beam received and reflected by the convergent reflector from the plane reflector, to reflect the diverging, amplified beam as a substantially collimated beam; and time delay means and recombination means, positioned to intercept each replicated beam of N replicated beams reflected from the second diverging reflector, for rendering the N replicated beams parallel in a contiguous array of N beams and for introducing relative time delays in the N replicated beams so that the replicated beams are substantially temporally coincident.

* * * * *